(12) United States Patent
Kamei et al.

(10) Patent No.: US 10,617,127 B2
(45) Date of Patent: Apr. 14, 2020

(54) CONTAINER REFRIGERATION APPARATUS WITH NITROGEN-ENRICHED AIR SUPPLY AND FAN CONTROL

(71) Applicant: DAIKIN INDUSTRIES, LTD., Osaka-shi, Osaka (JP)

(72) Inventors: Noritaka Kamei, Osaka (JP); Yuusuke Fujimoto, Osaka (JP); Makoto Ikemiya, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 118 days.

(21) Appl. No.: 15/754,905

(22) PCT Filed: Aug. 24, 2016

(86) PCT No.: PCT/JP2016/003862
§ 371 (c)(1),
(2) Date: Feb. 23, 2018

(87) PCT Pub. No.: WO2017/038055
PCT Pub. Date: Mar. 9, 2017

(65) Prior Publication Data
US 2018/0252461 A1 Sep. 6, 2018

(30) Foreign Application Priority Data

Aug. 28, 2015 (JP) ................. 2015-168724

(51) Int. Cl.
*F25D 11/00* (2006.01)
*A23B 7/148* (2006.01)
(52) U.S. Cl.
CPC ............ *A23B 7/148* (2013.01); *F25D 11/003* (2013.01); *F25B 2600/11* (2013.01)
(58) Field of Classification Search
CPC ..... F25D 11/003; F25B 2600/11; A23B 7/148
See application file for complete search history.

(56) References Cited

U.S. PATENT DOCUMENTS 5,515,693 A 5/1996 Cahill-O'Brien et al.
6,615,908 B1 * 9/2003 Bosher .................. A23L 3/3418
165/48.1
(Continued)

FOREIGN PATENT DOCUMENTS

EP 0667503 A1 8/1995
JP 2635535 B2 7/1997
WO WO 2015/049840 A1 4/2015

OTHER PUBLICATIONS

International Search Report (PCT/ISA/210) issued in PCT/JP2016/003862, dated Nov. 22, 2016.

*Primary Examiner* — David J Teitelbaum
(74) *Attorney, Agent, or Firm* — Birch, Stewart, Kolasch & Birch, LLP

(57) ABSTRACT

A gas supply device supplies an internal space of a container with nitrogen-enriched air to reduce an oxygen concentration of the internal space. If the oxygen concentration of the internal space gradually falls to reach a reference concentration C2, the gas supply device stops. If outside air enters the internal space at a gap between the container and a container refrigeration apparatus, the oxygen concentration of the internal space rises after the stop of the gas supply device. If the oxygen concentration of the internal space rises to reach an upper limit concentration C3, an internal fan controller switches a rotational speed of an internal fan from "HIGH" to "LOW." The gas supply device is activated. As a result, the amount of the outside air entering the internal space can be reduced to reliably drop the oxygen concentration of the internal space.

7 Claims, 12 Drawing Sheets

(56) References Cited

U.S. PATENT DOCUMENTS

| | | | |
|---|---|---|---|
| 2008/0197544 A1 | 8/2008 | Saijo et al. | |
| 2009/0211298 A1* | 8/2009 | Saul | A23L 3/3418 |
| | | | 62/640 |
| 2012/0325086 A1* | 12/2012 | Schaefer | A23B 7/148 |
| | | | 95/26 |
| 2014/0326021 A1* | 11/2014 | Wagner | A62C 99/0018 |
| | | | 62/617 |
| 2015/0168046 A1* | 6/2015 | Kurata | B65D 88/745 |
| | | | 62/186 |
| 2016/0245555 A1 | 8/2016 | Tanaka et al. | |

\* cited by examiner

FIG.9

TIME POINTS AT WHICH VALVE SWITCHS AND STATE OF ABSORPTION COLUMN

| OPERATION | FIRST OPERATION | PRESSURE EQUALIZATION OPERATION | SECOND OPERATION | PRESSURE EQUALIZATION OPERATION |
|---|---|---|---|---|
| FIRST DIRECTIONAL CONTROL VALVE | FIRST STATE | | SECOND STATE | FIRST STATE |
| SECOND DIRECTIONAL CONTROL VALVE | FIRST STATE | | SECOND STATE | |
| FIRST ADSORPTION COLUMN | PRESSURIZATION/ADSORPTION | PRESSURIZATION/ADSORPTION | DEPRESSURIZATION/DESORPTION | PRESSURIZATION/ADSORPTION |
| SECOND ADSORPTION COLUMN | DEPRESSURIZATION/DESORPTION | PRESSURIZATION/ADSORPTION | PRESSURIZATION/ADSORPTION | PRESSURIZATION/ADSORPTION |

FIG.10

FIRST OPERATION MODE(→8%)

| OPERATION | FIRST OPERATION | PRESSURE EQUALIZATION OPERATION | SECOND OPERATION | PRESSURE EQUALIZATION OPERATION |
|---|---|---|---|---|
| EXHAUST OPEN/ CLOSE VALVE | | CLOSED | | |
| SUPPLY OPEN/ CLOSE VALVE | | OPEN | | |
| NITROGEN-ENRICHED AIR | | SUPPLIED | | |

FIG.11

SECOND OPERATION MODE (8%→5%)

| OPERATION | FIRST OPERATION | | PRESSURE EQUALIZATION OPERATION | SECOND OPERATION | | PRESSURE EQUALIZATION OPERATION |
|---|---|---|---|---|---|---|
| EXHAUST OPEN/CLOSE VALVE | OPEN | CLOSED | | OPEN | CLOSED | |
| SUPPLY OPEN/CLOSE VALVE | CLOSED | OPEN | | CLOSED | OPEN | |
| NITROGEN-ENRICHED AIR | EXHAUSTED | SUPPLIED | | EXHAUSTED | SUPPLIED | |

CONTAINER REFRIGERATION APPARATUS WITH NITROGEN-ENRICHED AIR SUPPLY AND FAN CONTROL

TECHNICAL FIELD

The present invention relates to a container refrigeration apparatus provided with a gas supply device supplying nitrogen-enriched air into a container.

BACKGROUND ART

A typical container refrigeration apparatus disclosed, for example, in Patent Document 1 cools air in a container used for marine transportation, for example.

Plants (e.g., bananas and avocados) in such a container still breathe even after harvest by absorbing oxygen in the air and releasing carbon dioxide. These breathing plants consume nutrients and water stored in the plants themselves, and the plants significantly deteriorate as their respiration rate increases. Thus, oxygen concentration in the container is preferably low to the degree that the plants do not develop a breathing problem.

Patent Document 1 discloses an internal environment control system to reduce oxygen concentration of air inside a container by generating nitrogen-enriched air higher in nitrogen concentration than atmosphere and supplying this nitrogen-enriched air into the container. When the internal environment control system reduces the oxygen concentration of the inside air, a respiration rate of plants in the container decreases, curbing deterioration of the plants.

CITATION LIST

Patent Document

[Patent Document 1] Japanese Patent No. 2635535

SUMMARY OF THE INVENTION

Technical Problem

The above container refrigeration apparatus is equipped with an internal fan for circulating inside air between an internal space of the container and the container refrigeration apparatus. Generally, a rotational speed of the internal fan is controlled based on a parameter (e.g., a temperature of an internal space of the container) indicating an operating state of the container refrigeration apparatus.

While the internal fan is operating, air pressure near an inlet side of the internal fan is lower than that in the internal space of the container and air pressure near an outlet side of the internal fan is higher than that in the space inside the container. Hence, when the internal fan rotates at a high speed, the air pressure near the inlet side of the internal fan decreases below the atmospheric pressure. This could make outside air flow inside the container. When the amount of outside air flowing into the container increases, the oxygen concentration of the air inside the container cannot drop sufficiently. As a result, plants stored in the internal space of the container could not remain fresh.

In view of the foregoing background, it is therefore an object of the invention to reliably drop an oxygen concentration of air inside a container so that objects such as plants stored in a container remain fresh.

Solution to the Problem

A first aspect is directed to a container refrigeration apparatus provided to a container (11) and cooling air inside the container (11). The container refrigeration apparatus includes: an internal fan (26) circulating the air between an internal space (11a) of the container (11) and the container refrigeration apparatus; an internal fan controller (101) controlling a rotational speed of the internal fan (26); and a gas supply device (30) supplying the internal space (11a) of the container (11) with nitrogen-enriched air higher in nitrogen concentration and lower in oxygen concentration than outside air, wherein if the oxygen concentration of the internal space (11a) falls to a reference concentration, the gas supply device (30) stops, and if a concentration-rise condition indicating a rise of the oxygen concentration of the internal space (11a) is met while the gas supply device (30) stops, the internal fan controller (101) performs a fan-speed limiting operation of decreasing the rotational speed of the internal fan (26) and maintaining the rotational speed at a reference rotational speed or below.

In the first aspect, when the gas supply device (30) supplies nitrogen-enriched air into the internal space (11a) of the container (11), the oxygen concentration of the internal space (11a) (i.e., the oxygen concentration of the air inside the internal space (11a)) falls below outside air. Meanwhile, during the operation of the internal fan (26), if the rotational speed of the internal fan (26) is high, air pressure near the inlet side of the internal fan (26) falls below atmospheric pressure. This could make the outside air enter the internal space (11a) of the container (11). Then, if the outside air enters the internal space (11a) of the container (11) when the gas supply device (30) stops, the oxygen concentration of the internal space (11a) rises.

Hence, if the concentration-rise condition is met while the gas supply device (30) stops, the internal fan controller (101) of the first aspect performs the fan-speed limiting operation to decrease the rotational speed of the internal fan (26) and maintain the rotational speed at the reference rotational speed or lower. Compared with a state where the rotational speed of the internal fan (26) is higher than the reference rotational speed, in a state where the rotational speed of the internal fan (26) is at the reference rotational speed or lower, air pressure near the inlet side of the internal fan (26) rises. As a result, a decrease is observed in the amount of outside air entering the internal space (11a) of the container (11).

In a second aspect directed to the container refrigeration apparatus of the first aspect, the concentration-rise condition of the internal fan controller (101) may be a condition in which the oxygen concentration of the internal space (11a) rises to an upper limit concentration higher than the reference concentration.

In a third aspect directed to the container refrigeration apparatus of the first aspect or the second aspect, if the concentration-rise condition is met while the gas supply device (30) stops, the gas supply device (30) may start to operate.

In the third aspect, if the concentration-rise condition is met while the gas supply device (30) stops, the internal fan controller (101) performs the fan-speed limiting operation, and the gas supply device (30) starts to supply nitrogen-enriched air. Such a feature not only reduces the amount of outside air entering the internal space (11a) of the container (11) but also resumes the supply of the nitrogen-enriched air by the gas supply device (30) into the internal space (11a). Thus, the oxygen concentration of the internal space (11a) rises once due to the entering outside air. After that, however, the oxygen concentration immediately falls by the nitrogen-enriched air supplied into the internal space (11a).

In a fourth aspect directed to the container refrigeration apparatus of any one of the first to third aspects, only if a temperature of the air inside the internal space (11a) is within a predetermined target temperature range, the internal fan controller (101) may perform the fan-speed limiting operation.

In the fourth aspect, if a temperature of the internal air inside the internal space (11a) is out of a predetermined target temperature range, the internal fan controller (101) does not perform the fan-speed limiting operation even if the concentration-rise condition is met while the gas supply device (30) stops. Specifically, the internal fan controller (101) prioritizes control of the temperature of the internal space (11a) over control of the oxygen concentration of the internal space (11a).

Advantages of the Invention

In the aspects of the present disclosure, if the concentration-rise condition is met while the gas supply device (30) stops, the internal fan controller (101) performs the fan-speed limiting operation to decrease the rotational speed of the internal fan (26) and maintain the rotational speed at the reference rotational speed or lower. Such a feature makes it possible to reduce the amount of outside air entering the internal space (11a) of the container (11), contributing to curbing a rise of the oxygen concentration of the internal space (11a) while the gas supply device (30) stops. As a result, the oxygen concentration of the air inside the container (11) can reliably fall, so that objects such as plants stored in the container (11) can remain fresh.

When the plants such as bananas and avocados are stored in the internal space (11a) of the container (11), if the amount of oxygen to be consumed by the breathing plants stored in the internal space (11a) exceeds the amount of oxygen entering the internal space (11a), the oxygen concentration of the internal space (11a) gradually falls even if the gas supply device (30) remains stopping.

Meanwhile, in the third aspect, if the concentration-rise condition is met while the gas supply device stops, the gas supply device (30) starts operation. Hence, nitrogen-enriched air is supplied to the internal space (11a) of the container (11), contributing to an immediate fall of the oxygen concentration of the internal space (11a).

BRIEF DESCRIPTION OF THE DRAWINGS

FIG. 9 is a timing diagram indicating time points at which a valve switches and a state of an absorption column observed when the CA system of the container refrigeration apparatus of the first embodiment performs a gas production operation.

FIG. 10 is a timing diagram indicating time points at which the valve switches when the CA system of the container refrigeration apparatus of the first embodiment operates in a first operation mode.

FIG. 11 is a timing diagram indicating time points at which the valve switches when the CA system of the container refrigeration apparatus of the first embodiment operates in a second operation mode.

DETAILED DESCRIPTION

An embodiment of the present invention will now be described in detail with reference to the drawings. Note that the following description of the embodiment is merely an example in nature, and is not intended to limit the scope, application, or uses of the present invention.

Figure 1:
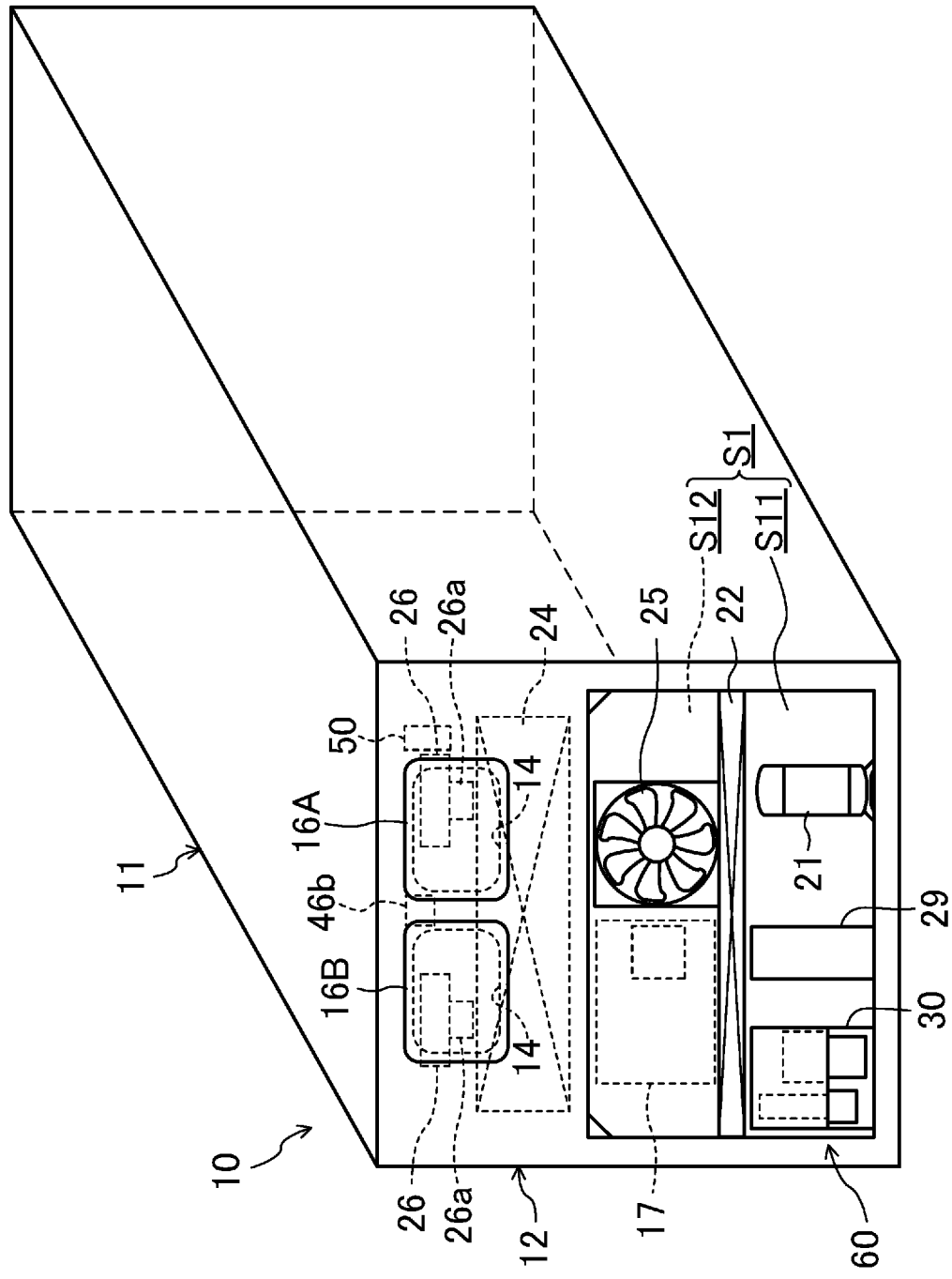
FIG. 1 is a perspective view illustrating a container refrigeration apparatus of a first embodiment as viewed from outside.
Figure 2:
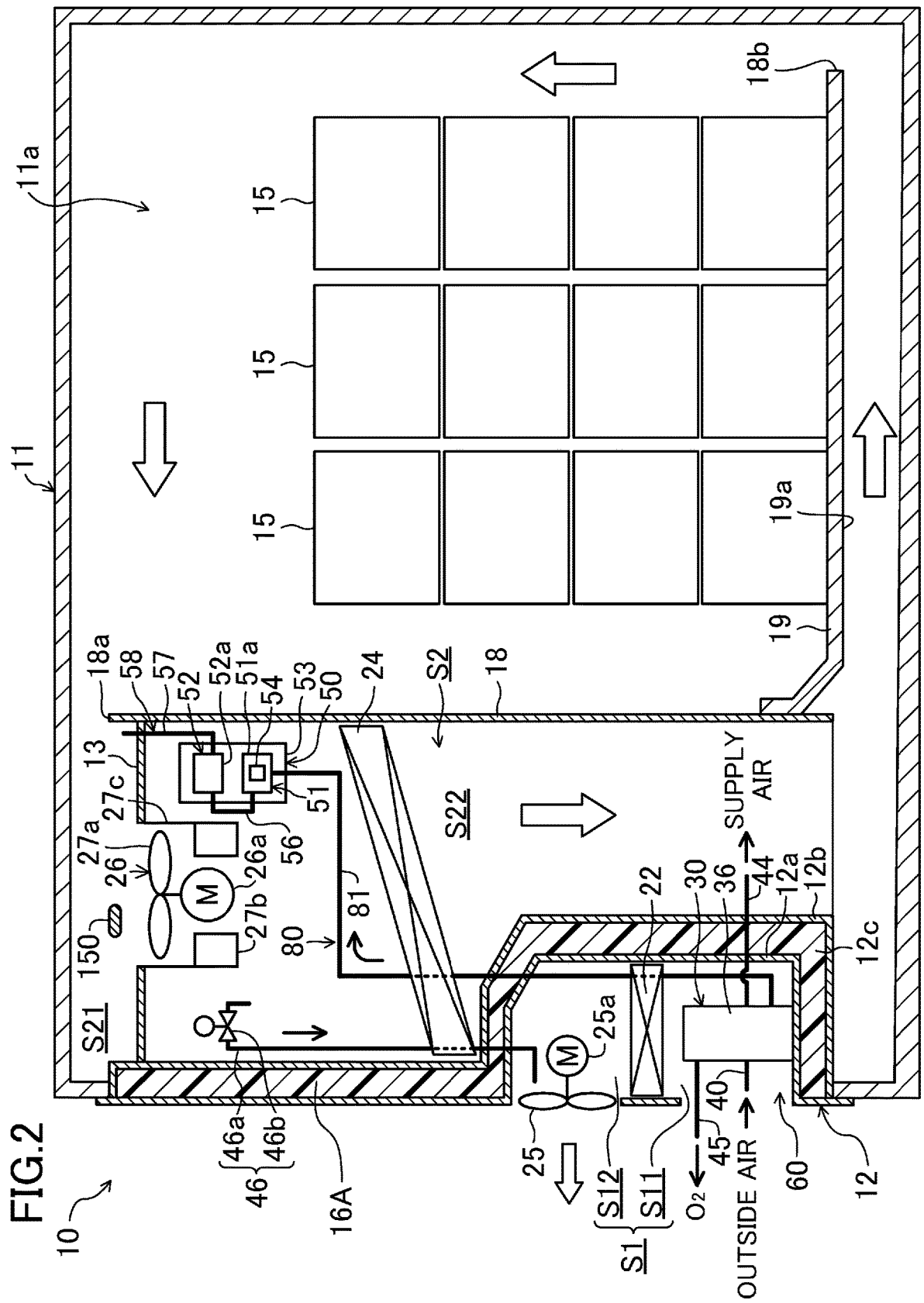
FIG. 2 is a cross-sectional side view illustrating a general configuration of the container refrigeration apparatus of the first embodiment.

As shown in FIGS. 1 and 2, a container refrigeration apparatus (10) is provided for a container (11) for use in, for example, marine transportation, and cools the air inside the container (11). Boxed plants (15) are stored in an internal space (11a) of the container (11). The plants (15) breathe by absorbing oxygen ($O_2$) in the air and releasing carbon dioxide ($CO_2$) into the air. Examples of such plants (15) include fruits like bananas and avocados, vegetables, cereals, bulbous plants, and natural flowers.

The container (11) has the shape of an elongate box with an open end surface. The container refrigeration apparatus (10) includes a casing (12), a refrigerant circuit (20), a unit controller (100), and a controlled atmosphere system (CA system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior wall (12a) and the interior wall (12b) are made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the exterior and interior walls (12a, 12b).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). Each of the two access openings (14) is closed by a corresponding one of first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

An inlet (18a) is formed between the upper end of the partition plate (18) and a ceiling surface of the container (11). The air inside the container (11) is taken into the internal storage space (S2) through the inlet (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) separates the internal storage space (S2) into a primary space (S21) on the inlet side of the internal fans (26), and a secondary space (S22) on the outlet side of the internal fans (26). In this embodiment, the partition wall (13) partitions the internal storage space (S2) vertically such that the primary space (S21) on the inlet side is defined above the secondary space (S22) on the outlet side.

A floorboard (19) is disposed in the container (11) with a clearance left between the floorboard (19) and the bottom surface of the container (11). The boxed plants (15) are placed on the floorboard (19). An underfloor path (19a) is defined between the floorboard (19) and the bottom surface of the container (11). A clearance is left between the lower end of the partition plate (18) and the bottom surface of the container (11), and communicates with the underfloor path (19a).

An outlet (18b) is provided at an end of the floorboard (19) opposite from the open end of the container (11) (on the right side in FIG. 2). Through the outlet (18b), the air cooled by the container refrigeration apparatus (10) is blown into the container (11).

As described above, the internal storage space (S) is separated into the primary space (S21) and the secondary space (S22). The primary space (S21) communicates with the internal space (11a) through the inlet (18a). The secondary space (S22) communicates with the internal space (11a) through the underfloor path (19a) and the outlet (18b). When the internal fans (26) operate, the air circulates between the internal space (11a) and the internal storage space (S2) of the container refrigeration apparatus (10).

<Configuration of Such Devices as Refrigerant Circuit>

Figure 3:
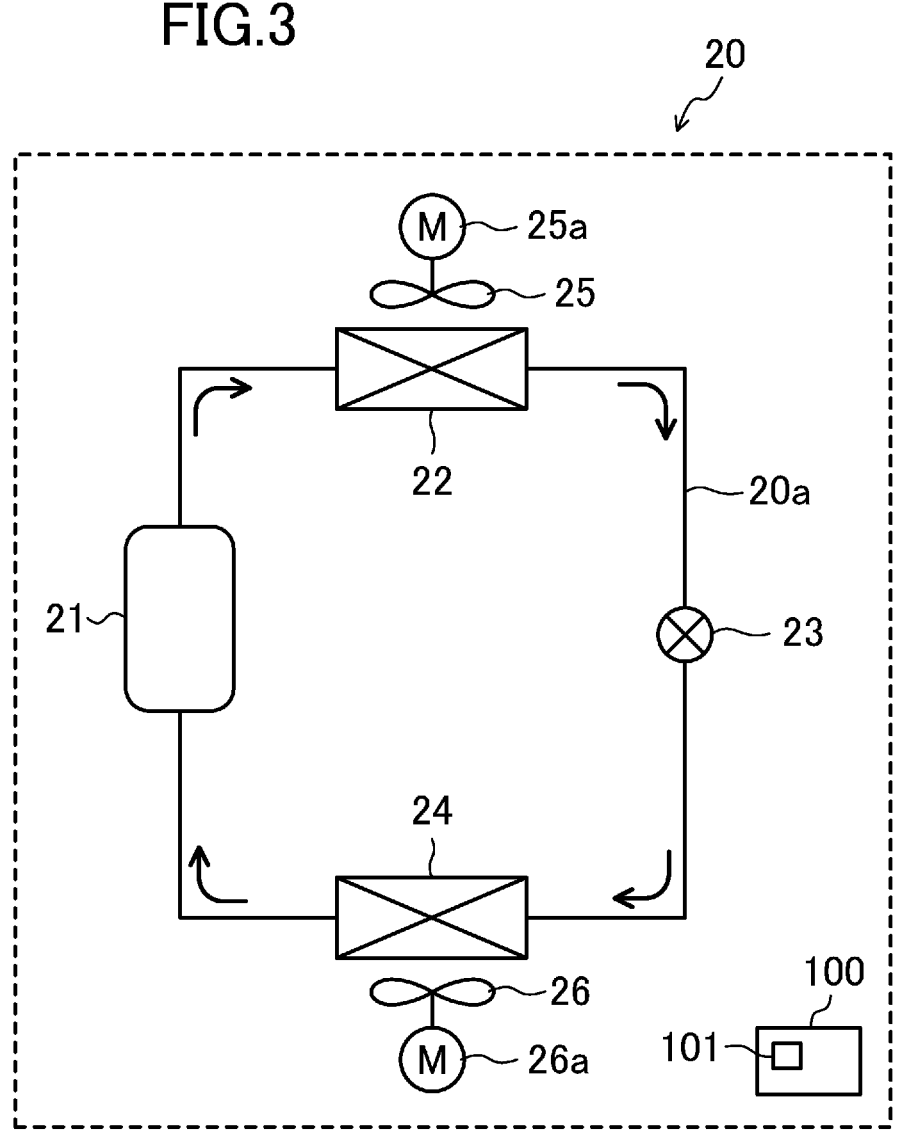
FIG. 3 is a piping diagram illustrating a configuration of a refrigerant circuit in the container refrigeration apparatus of the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven to rotate by an external fan motor (25a), guides the air in the external space of the container (11) (i.e., outside air) into the external storage space (S1), and sends the guided air to the condenser (22). In the condenser (22), heat is exchanged between a refrigerant compressed in the compressor (21) and flowing through the condenser (22) and the outside air sent from the external fan (25) to the condenser (22). In this embodiment, the external fan (25) is a propeller fan.

Two internal fans (26) are disposed near the evaporator (24). Each of the internal fans (26) is driven to rotate by an internal fan motor (26a), and draws the air inside the container (11) through the inlet (18a) and blows the air toward the evaporator (24). In the evaporator (24), heat is exchanged between the refrigerant having a pressure dropped by the expansion valve (23) and flowing through the evaporator (24) and the inside air sent to the evaporator (24) by the internal fans (26).

As shown in FIG. 2, each of the internal fans (26) includes a propeller fan (rotary vane) (27a), stationary vanes (27b), and a fan housing (27c). The propeller fan (27a) is coupled to the internal fan motor (26a), and driven by the internal fan motor (26a) to rotate about a rotation axis to blow the air in an axial direction. The stationary vanes (27b) are disposed on the outlet side of the propeller fan (27a) to rectify the flow of swirling air blown from the propeller fan (27a). The fan housing (27c) is comprised of a cylindrical member with the stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, separates the external storage space (S1) into a lower first space (S11) and an upper second space (S12). In the first space (S11), the compressor (21), an inverter box (29) which houses a driver circuit for driving the compressor (21) at a variable speed, and a gas supply device (30) of the CA system (60) are disposed. Meanwhile, the external fan (25) and an electrical component box (17) are disposed in the second space (S12). The first space (S11) is open toward the external space of the container (11). A plate member is arranged to close the second space (S12) from the external space of the container such that only an outlet of the external fan (25) is open toward the external space.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<Unit Controller>

The unit controller (100) controls the compressor (21) and the expansion valve (23) of the refrigerant circuit (20), the external fan (25), and the internal fan (26). Of all the units, the internal fan (26) is controlled by an internal fan controller (101) included in the unit controller (100). The internal fan controller (101) controls the rotational speed of the internal fan (26) in two stages; namely "HIGH" and "LOW." In this embodiment, the "LOW" rotational speed of the internal fan (26) is a reference rotational speed.

<CA System>

Figure 4:
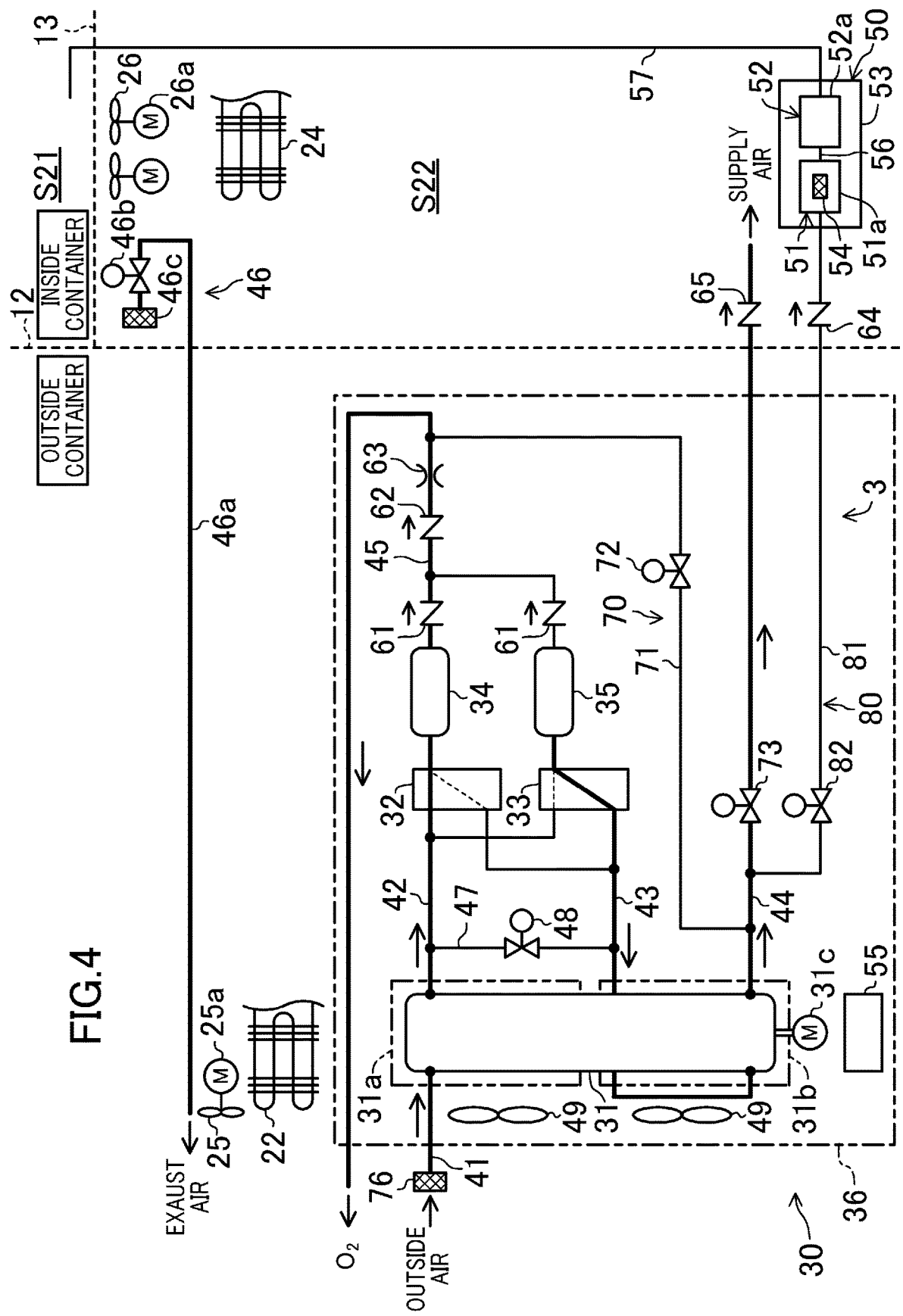
FIG. 4 is a piping diagram illustrating a configuration of a controlled atmosphere (CA) system in the container refrigeration apparatus of the first embodiment, together with a flow of air during a first operation.

As shown in FIG. 4, the CA system (60) includes a gas supply device (30), an exhaust portion (46), a sensor unit (50), and a controller (55), and controls an oxygen concentration and a carbon dioxide concentration of the air inside the container (11). The term "concentration" to be used in the following description always indicates a "volumetric concentration."

[Gas Supply Device]
—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Furthermore, the gas supply device (30) is disposed at the lower left corner of the external storage space (S1), as shown in FIG. 1.

As shown in FIG. 4, the gas supply device (30) includes: an air circuit (3) connecting an air pump (31), a first directional control valve (32) and a second directional control valve (33), and a first adsorption column (34) and a second adsorption column (35) each provided with an adsorbent for adsorbing a nitrogen component in the air; and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the unit case (36), and includes a first pump mechanism (a pressurizing portion) (31a) and a second pump mechanism (a depressurizing portion) (31b), each of which sucks and compresses the air and discharges the compressed air. The first and second pump mechanisms (31a) and (31b) are connected to a driving shaft of a motor (31c), and are driven by the motor (31c) to rotate to suck and compress the air, and discharge the compressed air.

One end of an outside air passage (41) arranged so as to pass through the unit case (36) from the interior to exterior of the unit case (36) is connected to the inlet of the first pump mechanism (31a). An air-permeable, waterproof membrane filter (76) is provided at the other end of the outside air passage (41). The outside air passage (41) is made of a flexible tube. Although not shown in the drawings, the other end of the outside air passage (41) where the membrane filter (76) is provided is arranged in the second space (S12) of the external storage space (S1) above the condenser (22). Due to this configuration, the first pump mechanism (31a) sucks and compresses the outside air from which moisture has been removed while flowing from the outside to inside of the unit case (70) through the membrane filter (76) provided at the other end of the outside air passage (41). On the other hand, an outlet of the first pump mechanism (31a) is connected to one end of a discharge passage (42). The other end (downstream end) of the discharge passage (42) is divided into two branches, each of which is connected to one of the first directional control valve (32) and the second directional control valve (33).

An inlet of the second pump mechanism (31b) is connected to one end of a suction passage (43). The other end (upstream end) of the suction passage (43) is divided into two branches, each of which is connected to one of the first directional control valve (32) and the second directional control valve (33). On the other hand, an outlet of the second pump mechanism (31b) is connected to one end of a supply passage (44). The other end of the supply passage (44) opens in the secondary space (S22) on the outlet side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

Note that, in this embodiment, the discharge passage (42) and the suction passage (43) are connected together with the bypass passage (47). The bypass passage (47) is provided with a bypass open/close valve (48) controlled to open and close by the controller (55).

The first and second pump mechanisms (31a) and (31b) of the air pump (31) are configured as oil-free pumps without lubricant oil. Two blower fans (49) are disposed on the side of the air pump (31) to cool the air pump (31) by blowing air to the air pump (31).

(Directional Control Valve)

The first and second directional control valves (32) and (33) are provided in the air circuit (3) between the air pump (31) and the first and second adsorption columns (34) and (35), and switch the connection state between the air pump (31) and the first and second adsorption columns (34) and (35) among the following three connection states (i.e., first to third connection states). The controller (55) controls the switching between the first to third connection states.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35) (functioning as an inlet during pressurization). The second directional control valve (33) switches between the first state where the second adsorption column (35) is allowed to communicate with the inlet of the second pump mechanism (31b) to be blocked from the outlet of the first pump mechanism (31a) (the state shown in FIG. 4), and the second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to the first state, the air circuit (3) is switched to the first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
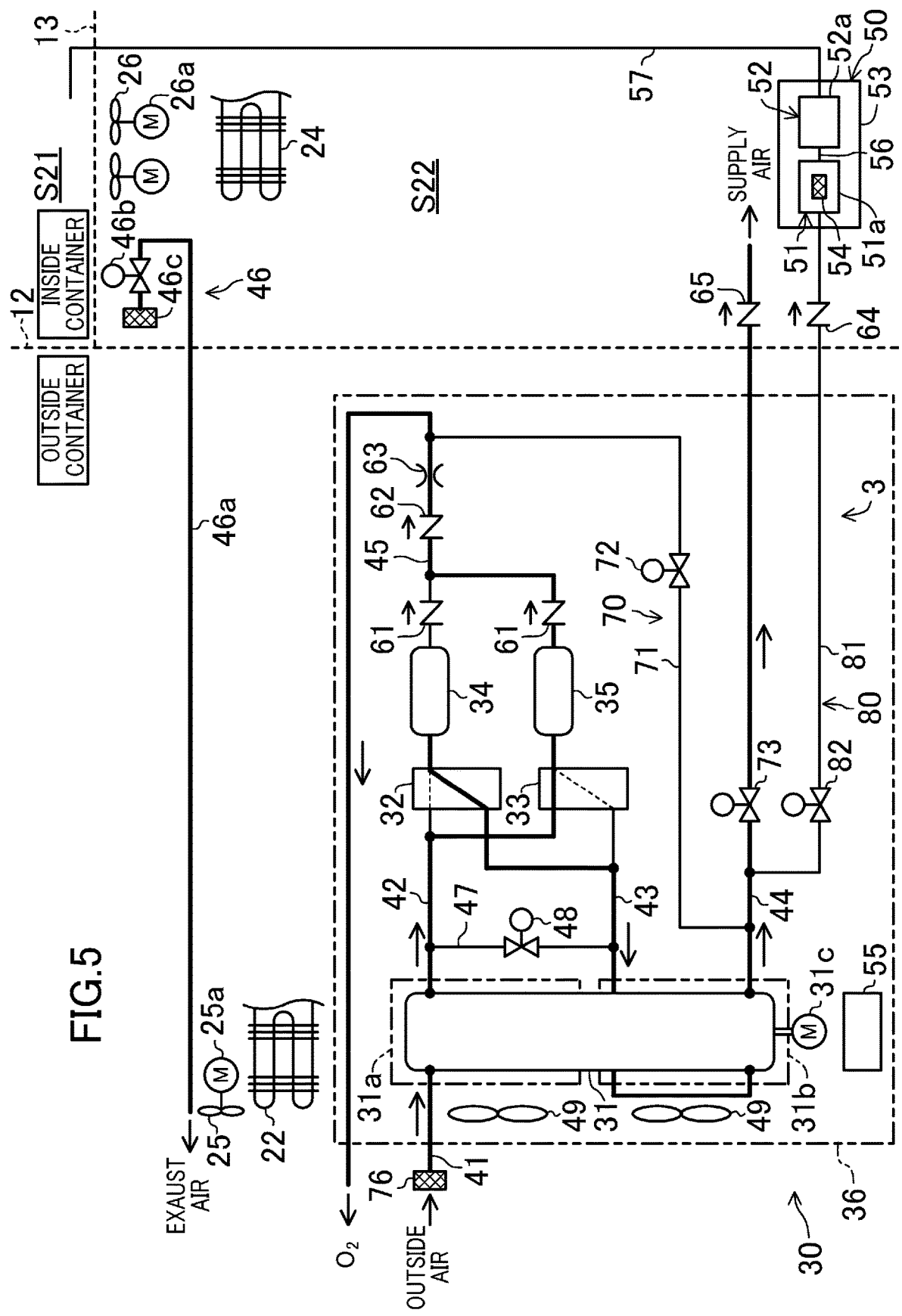
FIG. 5 is a piping diagram illustrating a configuration of the CA system in the container refrigeration apparatus of the first embodiment, together with a flow of the air during a second operation.

If the first and second directional control valves (32) and (33) are set to be the second state, the air circuit (3) is switched to the second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

Figure 6:
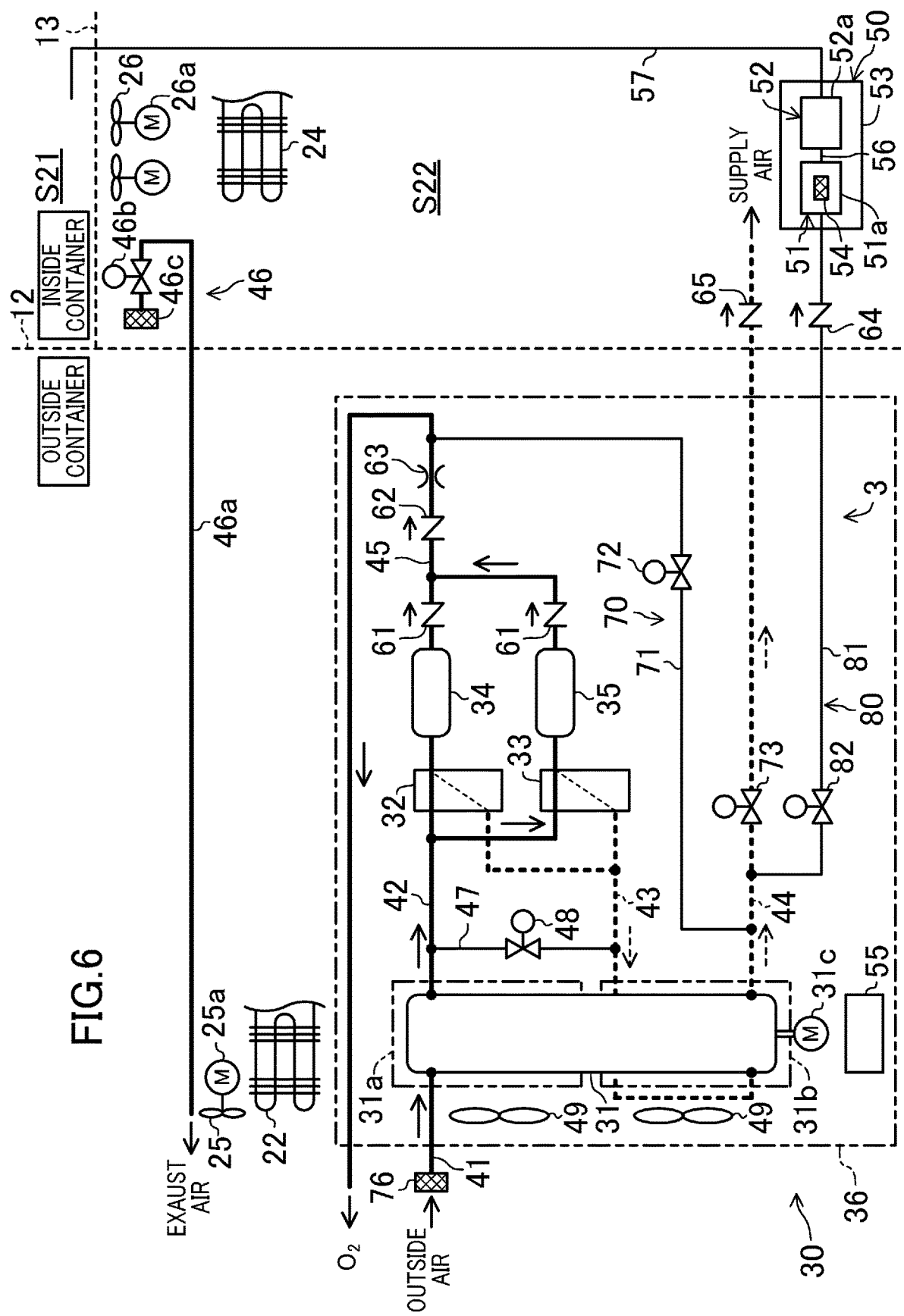
FIG. 6 is a piping diagram illustrating a configuration of the CA system in the container refrigeration apparatus of the first embodiment, together with a flow of the air during a pressure equalization operation.

If the first directional control valve (32) is set to the first state and the second directional control valve is set to the second state, the air circuit (3) is switched to the third connection state where the outlet of the first pump mechanism (31a) is connected to the first adsorption column (34), and the outlet of the first pump mechanism (31a) is connected to the second adsorption column (35) (see FIG. 6). In this state, both of the first and second adsorption columns (34) and (35) are connected to the outlet of the first pump mechanism (31a), which supplies compressed outside air to both of the first and second adsorption columns (34) and (35). In this state, the adsorption operation is performed on both of the first and second adsorption columns (34) and (35).

(Adsorption Column)

Each of the first and second adsorption columns (34) and (35) is comprised of a cylindrical member whose interior is filled with an adsorbent. The adsorbent that fills the first and second adsorption columns (34) and (35) absorbs a nitrogen component under pressure, and desorbs the absorbed nitrogen component under reduced pressure.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air can be absorbed, using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied to the interior of the container (11), thus increasing the humidity in the container (11). Furthermore, the adsorbent is regenerated, which can extend the adsorbent's life.

In this configuration, if the air pump (31) supplies the compressed outside air to the first and second adsorption columns (34) and (35) to pressurize the interiors of these columns (34) and (35), a nitrogen component in the outside air is adsorbed onto the adsorbent. This produces oxygen-enriched air lower in nitrogen concentration and higher in oxygen concentration than outside air since the oxygen-enriched air includes a smaller amount of the nitrogen component than the outside air does. On the other hand, if the air pump (31) sucks the air from the first and second adsorption columns (34) and (35) to depressurize these columns (34) and (35), the nitrogen adsorbed onto the adsorbent is desorbed. This produces nitrogen-enriched air higher in nitrogen concentration and lower in oxygen concentration than outside air since the nitrogen-enriched air includes a larger amount of nitrogen component than the outside air does. In this embodiment, the nitrogen-enriched air may be 92% nitrogen and 8% oxygen, for example.

The respective other ends of the first and second adsorption columns (34) and (35) (functioning as outlets during pressurization) are connected to one end of an oxygen exhaust passage (45) through which the oxygen-enriched air that has been produced in the first and second adsorption columns (34) and (35) from the compressed outside air supplied by the first pump mechanism (31a) is guided toward the outside of the container (11). The one end of the oxygen exhaust passage (45) is divided into two branches, each of which is connected to one of the other ends of the first and second adsorption columns (34) and (35). The other end of the oxygen exhaust passage (45) opens outside the gas supply device (30); that is, outside the container (11). A portion of the oxygen exhaust passage (45) connected to the other end of the first adsorption column (34) and another portion of the oxygen exhaust passage (45) connected to the other end of the second adsorption column (35) are each provided with a check valve (61). Each of check valves (61) prevents backflow of the air from the oxygen exhaust passage (45) toward the first and second adsorption columns (34) and (35).

A check valve (62) and an orifice (63) are arranged at points of the oxygen exhaust passage (45) so as to be sequentially arranged from one end to the other end of the oxygen exhaust passage (45). The check valve (62) prevents backflow of the nitrogen-enriched air from an exhaust connection passage (71), described later, toward the first and second adsorption columns (34) and (35). The orifice (63) depressurizes the oxygen-enriched air which has flowed out of the first and second adsorption columns (34) and (35) before the oxygen-enriched air is exhausted from the container (11).

(Supply-Exhaust Switching Mechanism)

The air circuit (3) is provided with a supply-exhaust switching mechanism (70) which switches between a gas supply operation, described later, of supplying the produced nitrogen-enriched air into the container (II), and a gas exhaust operation of exhausting the produced nitrogen-enriched air to the outside of the container (11). See FIGS. 4 and 5 for the gas supply operation and FIG. 7 for the gas exhaust operation. The supply-exhaust switching mechanism (70) includes an exhaust connection passage (71), an exhaust open/close valve (72), and a supply open/close valve (73).

The exhaust connection passage (71) has one end connected to the supply passage (44), and the other end connected to the oxygen exhaust passage (45). The other end of the exhaust connection passage (71) is connected to the oxygen exhaust passage (45) so as to be located further toward the outside of the container (11) than the orifice (63).

The exhaust open/close valve (72) is provided to the exhaust connection passage (71). The exhaust open/close valve (72) is provided at a point of an exhaust connection passage (71), and is comprised of a solenoid valve which is switched between an open state where the nitrogen-enriched air having flowed in from the supply passage (44) is allowed to flow, and a closed state where the nitrogen-enriched air is prevented from flowing. The controller (55) controls an opening/closing operation of the exhaust open/close valve (72).

The supply open/close valve (73) is provided at the supply passage (44) so as to be located further toward the other end (toward the inside of the container (11)) than the junction where the exhaust connection passage (71) is connected. The supply open/close valve (73) is provided at the supply passage (44) so as to be located further toward the inside of the container than the junction where the exhaust connection passage (71) is connected, and is comprised of a solenoid valve which is switched between an open state where the nitrogen-enriched air is allowed to flow toward the inside of the container (11), and a closed state where the nitrogen-enriched air is prevented from flowing toward the inside of the container (11). The controller (55) controls an opening/closing operation of the supply open/close valve (73).

(Measurement Unit)

Figure 8:
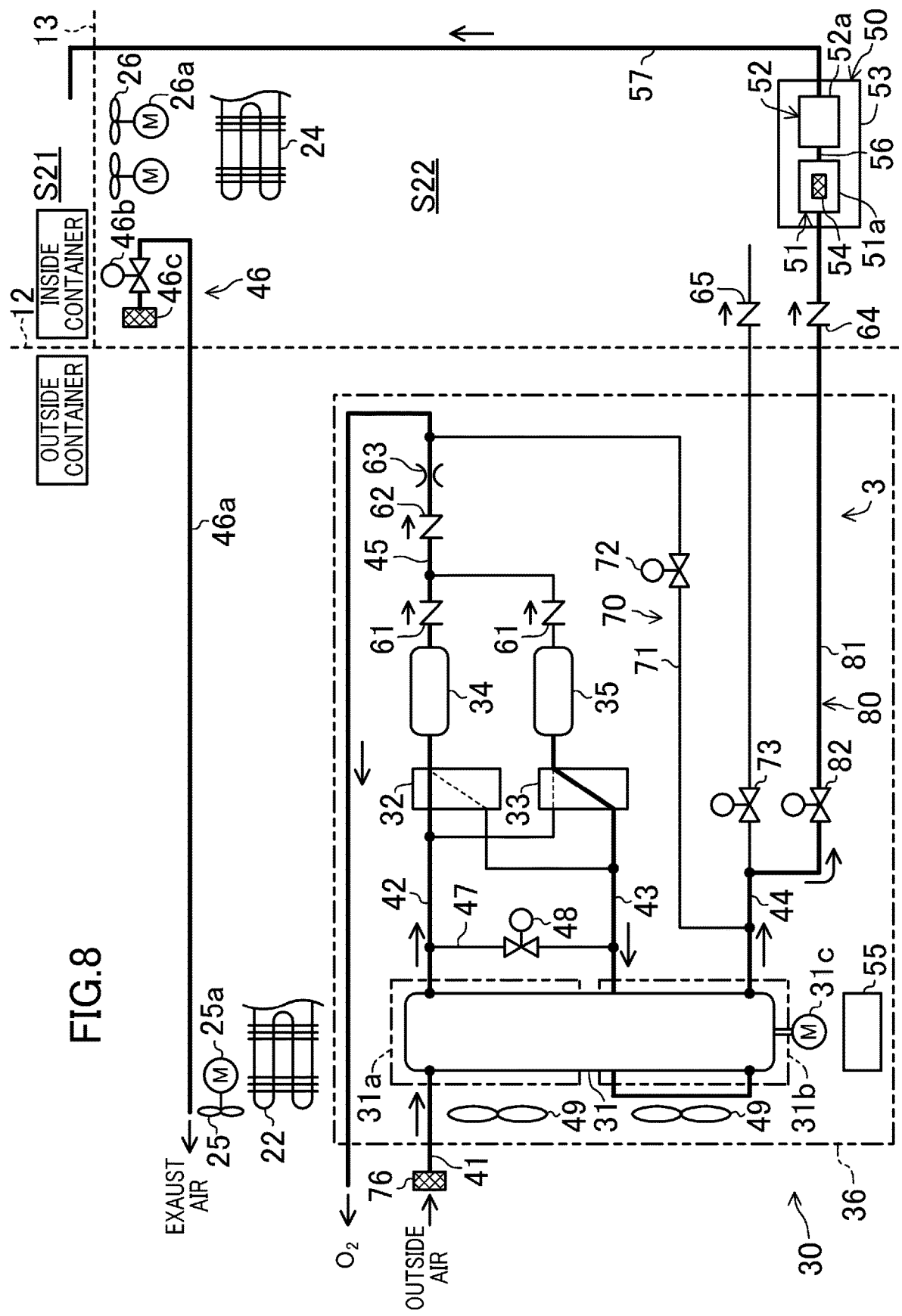
FIG. 8 is a piping diagram illustrating a configuration of the CA system in the container refrigeration apparatus of the first embodiment, together with a flow of the air during a supply air measurement operation.

The air circuit (3) is provided with a measurement unit (80) which performs a supply air measurement operation (see FIG. 8) for measuring a concentration of the generated nitrogen-enriched air, using an oxygen sensor (51) of a sensor unit (50) provided inside the container (11). The sensor unit (50) will be described later. The measurement unit (80) includes a branch pipe (a measurement passage) (81) and a measurement open/close valve (82). In the measurement unit (80), a portion of the nitrogen-enriched air flowing through the supply passage (44) branches off to be guided to the oxygen sensor (51).

Specifically, the branch pipe (81) has one end connected to the supply passage (44), and the other end coupled to an oxygen sensor box (51a) of the oxygen sensor (51). The oxygen sensor box (51a) will be described later. In this embodiment, the branch pipe (81) branches from the supply passage (44) in the unit case (36) and extends from the interior to exterior of the unit case (36).

The measurement open/close valve (82) is provided for the branch pipe (81) in the unit case (36). The measurement open/close valve (82) is comprised of a solenoid valve switching between an open state where the flow of nitrogen-enriched air in the branch pipe (81) is allowed, and a closed state where the flow of the nitrogen-enriched air in the branch pipe (81) is blocked. The controller (55) controls an opening/closing operation of the measurement open/close valve (82). As will be described in detail later, the measurement open/close valve (82) is open only when the supply air measurement operation to be described later is performed, and is closed in the other modes.

(Controller)

As described above, the controller (55) controls appliances, included in the gas supply device (30), such as the air pump (31) and the directional control valves (32) and (33).

Moreover, the controller (55) receives a value measured by the oxygen sensor (51) of the sensor unit (50). The value is an actually measured oxygen concentration of the air inside the internal space (11a). The controller (55) controls the operation of the gas supply device (30), depending on the oxygen concentration of the internal space (11a).

Specifically, the controller (55) stores a mode switching reference concentration C1, a stop reference concentration C2, an upper limit concentration C3, and a setting concentration Cs. The stop reference concentration C2 is lower than the upper limit concentration C3, and the upper limit concentration C3 is lower than the mode switching reference concentration C1 (C2<C3<C1). Furthermore, in the controller (55) of this embodiment, the setting concentration Cs is lower than the stop reference concentration C2 (Cs<C2). Note that, in certain instances, the setting concentration Cs can be equal to the stop reference concentration C2.

When the oxygen concentration of the internal space (11a) (i.e., the value measured by the oxygen sensor (51)) falls to reach the mode switching reference concentration C1, the controller (55) switches an operation mode to be executed from a first operation mode to a second operation mode. Moreover, when the oxygen concentration of the internal space (11a) falls to reach the stop reference concentration C2, the controller (55) stops the gas supply device (30). Furthermore, when the oxygen concentration of the internal space (11a) rises to reach the upper limit concentration C3, the controller (55) starts the gas supply device (30) to operate. Note that while the gas supply device (30) stops, the air pump (31) stops. While the gas supply device (30) operates, the air pump (31) operates.

—Operation Mechanism of Gas Supply Device—

(Gas Production Operation)

In the gas supply device (30), a first operation and a second operation are alternately repeated every predetermined time (e.g., 14.5 seconds) so as to produce the nitrogen-enriched air and the oxygen-enriched air. In the first operation, the first adsorption column (34) is pressurized and the second adsorption column (35) is depressurized simultaneously (see FIG. 4). In the second operation, the first adsorption column (34) is depressurized and the second adsorption column (35) is pressurized simultaneously (see FIG. 5). Moreover, in this embodiment, a pressure equalization operation in which both of the first and second adsorption columns (34) and (35) are pressurized (see FIG. 6) is performed for a predetermined time (e.g., 1.5 seconds) during the intervals between the first operation and the second operation (see FIG. 9). The operations are switched by the controller (55) operating the first and directional control valves (32) and (33).

<<First Operation>>

During the first operation, the controller (55) switches both of the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). The nitrogen component contained in the air which has flowed into the first adsorption column (34) is adsorbed on the adsorbent of the first adsorption column (34). Thus, during the first operation, the first pump mechanism (31a) supplies the compressed outside air to the first adsorption column (34), in which the adsorbent adsorbs nitrogen component in the outside air, thereby producing oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31b) sucks the air from the second adsorption column (35). Simultaneously, the second pump mechanism (31b) also sucks the nitrogen component adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

<<Second Operation>>

During the second operation, the controller (55) switches both of the first and second directional control valves (32) and (33) to the second state shown in FIG. 5. Thus, the air circuit (3) is set to the second connection state in which the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). The nitrogen component contained in the air which has flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs the nitrogen component in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks the nitrogen component adsorbed onto the adsorbent in the first adsorption column (34) together with the air, thereby allowing the adsorbent to desorb nitrogen component. Thus, during the second operation, the second pump mechanism (31b) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

<<Pressure Equalization Operation>>

As illustrated in FIG. 6, during the pressure equalization operation, the controller (55) switches the first directional control valve (32) to the first state, and the second directional control valve (33) to the second state. Thus, the air circuit (3) is set to the third connection state where both of the first and second adsorption columns (34) and (35) communicate with the outlet of the first pump mechanism (31a) and are blocked from the inlet of the second pump mechanism (31b).

The first pump mechanism (31a) supplies the compressed outside air to both of the first and second adsorption columns (34) and (35). The nitrogen component contained in the air which has flowed into the first and second adsorption columns (34) and (35) is adsorbed onto the adsorbent of the first and second adsorption columns (34) and (35), and the oxygen-enriched air is produced. The oxygen-enriched air flows from the first and second adsorption columns (34) and (35) to the oxygen exhaust passage (45).

On the other hand, the second pump mechanism (31b) is blocked from the first and second adsorption columns (34) and (35). Thus, in the pressure equalization operation, no further nitrogen-enriched air is produced in the first and second adsorption columns (34) and (35). The second pump mechanism (31b) sucks and compresses the nitrogen-enriched air remaining in the suction passage (43), and discharges the compressed nitrogen-enriched air into the supply passage (44).

As mentioned above, in the first operation, the first adsorption column (34) is pressurized by the first pump mechanism (31a), thereby performing the adsorption operation, whereas the second adsorption column (35) is depressurized by the second pump mechanism (31b), thereby performing the desorption operation. On the other hand, in the second operation, the second adsorption column (35) is pressurized by the first pump mechanism (31a), thereby performing the adsorption operation, whereas the first adsorption column (34) is depressurized by the second pump mechanism (31b), thereby performing the desorption operation. Thus, if the first operation is switched to the second operation or the second operation is switched to the first operation without the pressure equalization operation performed during the interval between the first and second operations, the pressure in the adsorption column where the desorption operation has been performed before the switching is remarkably low immediately after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). Due to this configuration, the inner pressures of the first and second adsorption columns (34) and (35) are immediately equalized (i.e., become intermediate pressures between the inner pressures). The pressure equalization operation immediately increases the pressure in the adsorption column which has been depressurized by the second pump mechanism (31b) and performing the desorption operation before the switching. Thus, the adsorption operation is immediately performed after the connection to the first pump mechanism (31a).

In this manner, the gas supply device (30) alternately repeats the first and second operations, with the pressure equalization operation performed during the intervals, thereby producing the nitrogen-enriched air and the oxygen-enriched air in the air circuit (3).

(Gas Supply Operation/Gas Exhaust Operation)

In the gas supply device (30), the supply-exhaust switching mechanism (70) switches between the gas supply operation and the gas exhaust operation. The gas supply operation involves supplying the nitrogen-enriched air produced in the air circuit (3) into the container (11). The gas exhaust operation involves exhausting the produced nitrogen-enriched air from the start of the desorption operation for a predetermined time period, instead of supplying the nitrogen-enriched air into the container (11).

<<Gas Supply Operation>>

In the gas supply operation, the controller (55) controls the exhaust open/close valve (72) to close and the supply open/close valve (73) to open. Hence, the nitrogen-enriched air produced alternately in the first and second adsorption columns (34) and (35) is supplied into the container (11) through the supply passage (44), and the oxygen-enriched air also produced alternately in the first and second adsorption columns (34) and (35) is exhausted out of the container (11) through the oxygen exhaust passage (45).

<<Gas Exhaust Operation>>

Figure 7:
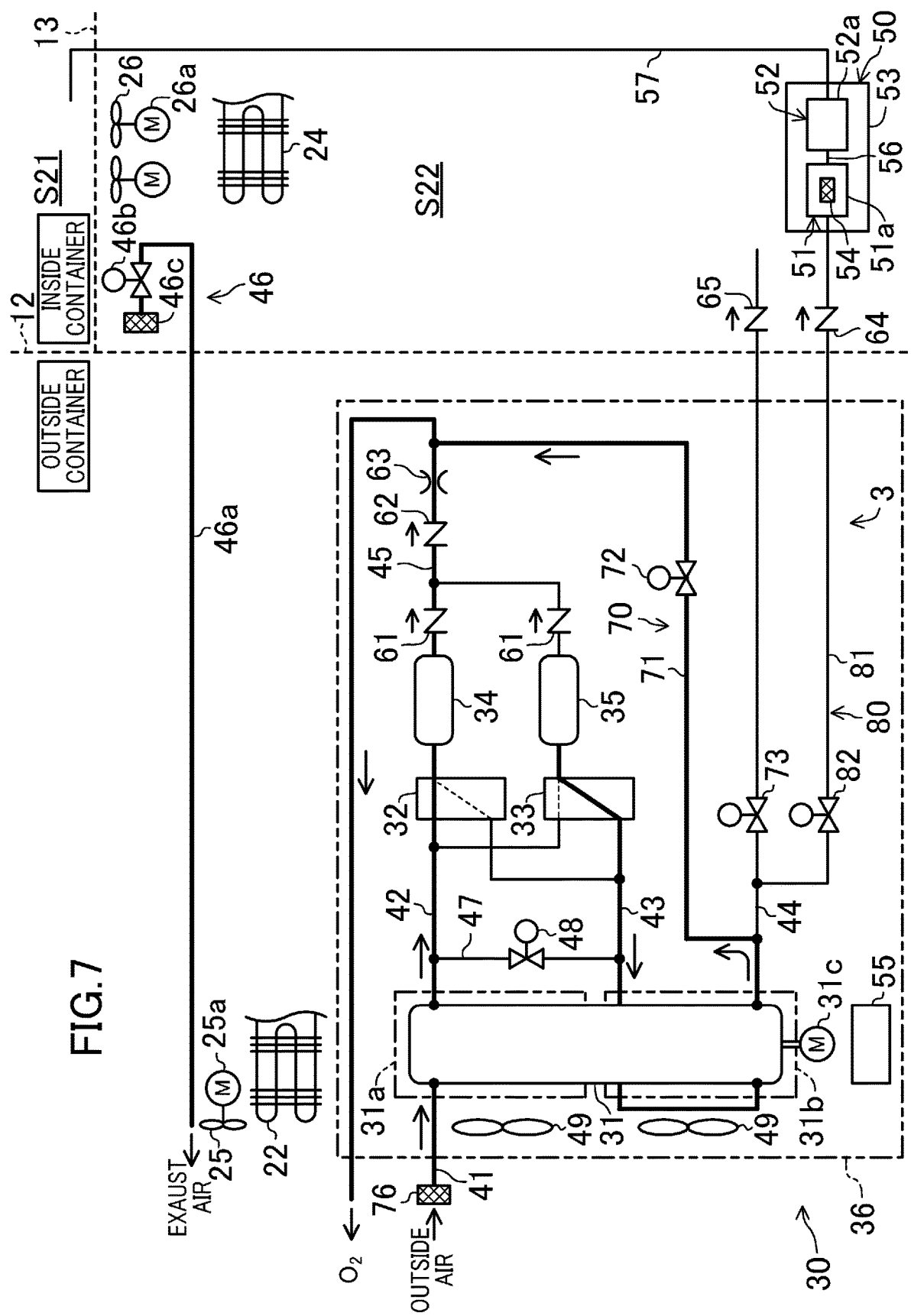
FIG. 7 is a piping diagram illustrating a configuration of the CA system in the container refrigeration apparatus of the first embodiment, together with a flow of the air during a gas exhaust operation.

As illustrated in FIG. 7, in the gas exhaust operation, the controller (55) controls the exhaust open/close valve (72) to open and the supply open/close valve (73) to close. Hence, the nitrogen-enriched air produced alternately in the first and second adsorption columns (34) and (35) and discharged to the supply passage (44) is blocked not to flow toward the interior of the container (11) from the supply open/close valve (73) in the supply passage (44). Instead, the nitrogen-enriched air flows into the exhaust connection passage (71).

Flowing into the exhaust connection passage (71), the nitrogen-enriched air flows into the oxygen exhaust passage (45) and is exhausted out of the container (11) along with the oxygen-enriched air flowing through the oxygen exhaust passage (45).

[Exhaust Portion]

—Configuration of Exhaust Portion—

As shown in FIG. 2, the exhaust portion (46) includes an exhaust passage (46a) connecting the internal storage space (S2) and the exterior space of the container (11), an exhaust valve (46b) connected to the exhaust passage (46a), and a membrane filter (46c) provided to an end (an end toward the interior of the container (11)) through which air flows into the exhaust passage (46a). The exhaust passage (46a) passes through the casing (12) from the interior to exterior of the casing (12). The exhaust valve (46b) is provided adjacent to an internal end of the exhaust passage (46a), and is comprised of a solenoid valve which is switched between an open state where the air is allowed to flow through the exhaust passage (46a), and a closed state where the air is prevented from flowing through the exhaust tube (46a). The controller (55) controls an opening/closing operation of the exhaust valve (46b).

—Operation of Exhaust Portion—

When the internal fan (26) is rotating, an exhaust operation is performed in which the controller (55) opens the exhaust valve (46b) to exhaust, out of the container (11), the air (inside air) in the internal storage space (S2) communicating with the interior of the container (11).

Specifically, when the internal fan (26) is rotating, the pressure of the secondary space (S22) on the outlet side becomes higher than the pressure of the exterior space of the container (11) (i.e., the atmospheric pressure). Thus, when the exhaust valve (46b) is open, due to the pressure difference between the ends of the exhaust passage (46a) (the pressure difference between the external space of the container (11) and the secondary space (S22), the air in the internal storage space (S2) communicating with the interior of the container (inside air) is exhausted out of the container (11) via the exhaust passage (46a).

[Sensor Unit]

—Configuration of Sensor Unit—

As shown in FIG. 2, the sensor unit (50) is provided in the secondary space (S22) on the outlet side of the internal fans (26) in the internal storage space (S2). The sensor unit (50) includes an oxygen sensor (51), a carbon dioxide sensor (52), a fixing plate (53), a membrane filter (54), a connection pipe (56), and an exhaust pipe (57).

The oxygen sensor (51) has an oxygen sensor box (51a) housing a galvanic-cell sensor therein. The oxygen sensor (51) measures a value of a current flowing through an electrolytic solution of the galvanic cell-type sensor to measure an oxygen concentration of a gas in the oxygen sensor box (51a). An outer surface of the oxygen sensor box (51a) is fixed to the fixing plate (53). Another outer surface of the oxygen sensor box (51a) opposite from the outer surface fixed to the fixing plate (53) has an opening. To the opening, the membrane filter (54) is attached. The membrane filter (54) is air-permeable and waterproof. In addition, one end of the connection pipe (56) is coupled via a connector to one of the side surfaces of the oxygen sensor box (51a). Furthermore, the branch pipe (81) of the measurement unit (80) is coupled via a connector (pipe joint) to a lower surface of the oxygen sensor box (51a).

The carbon dioxide sensor (52) has a carbon dioxide sensor box (52a). The carbon dioxide sensor (52) is a non-dispersive infrared sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). Furthermore, one end of the exhaust pipe (57) is coupled via a connector to the other side surface of the carbon dioxide sensor box (52a).

The fixing plate (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the inlet of the internal fans (26). That is, the exhaust pipe (57) allows the internal space of the carbon dioxide sensor box (52a) to communicate with the primary space (S21) of the internal storage space (S2).

—Concentration Measurement Operation—

As can be seen, the secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air inside the container (11) flows from the secondary space (S22) to the primary space (S21) in the air passage (58) to which the oxygen sensor (51) and the carbon dioxide sensor (52) are connected. Thus, the air sequentially flows from the interior of the container (11) to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) performs a concentration control operation for controlling the oxygen concentration and carbon dioxide concentration of the air inside the container (11) to desired concentrations. Specifically, the controller (55) controls the operations of the gas supply device (30) and the exhaust portion (46) based on measurement results obtained by the oxygen sensor (51) and the carbon dioxide sensor (52) so that the composition of the air inside the container (11) (oxygen concentration and carbon dioxide concentration) is controlled to a desired composition (e.g., 3% oxygen and 5% carbon dioxide). Specifically, the controller (55) performs the first operation mode (see FIG. 10), the second operation mode (see FIG. 11), and a stop mode to be described later. Each of the first and second operation modes is a combination of the gas production operation (see FIG. 9), the gas supply operation (see FIGS. 4 to 6), and the gas exhaust operation (see FIG. 7) performed by the gas supply device (30), and the exhaust operation performed by the exhaust portion (46). The stop mode involves stopping the operations performed by the gas supply device (30) and the exhaust portion (46).

In addition, the controller (55) controls the operation of the measurement on-off valve (82) in accordance with a command entered by a user or periodically so as to perform a supply air measurement operation of measuring the oxygen concentration of the nitrogen-enriched air produced by the gas supply device (30).

In this embodiment, the controller (55) includes a microcomputer controlling, as disclosed in the present application, each of the elements in the CA system (60), and a memory and a hard disc storing a control program to be executed. Note that the controller (55) is an example of a controller for the CA system (60). A detailed configuration and an algorithm of the controller (55) may be a combination of any hardware and software to execute functions according to the present invention.

—Operation—

<Operation of Refrigerant Circuit>

In this embodiment, the unit controller (100) shown in FIG. 3 performs a cooling operation for cooling the air inside the container (11).

During the cooling operation, the unit controller (100) controls the operations of the compressor (21), the expansion valve (23), the external fan (25), and the internal fans (26) so that the temperature of the inside air reaches a desired target temperature based on measurement results provided by an internal temperature sensor (150). In this case, the refrigerant circuit (20) allows the refrigerant to circulate to perform a vapor compression refrigeration cycle. Then, when passing through the evaporator (24), the air inside the container (11) guided to the internal storage space (S2) by the internal fans (26) is cooled by the refrigerant flowing through the evaporator (24). The inside air cooled by the evaporator (24) passes through the underfloor path (19a), and is blown again into the container (11) via the outlet (18b). Thus, the air in the container (11) is cooled.

<Concentration Control Operation>

In this embodiment, the controller (55) in FIG. 4 instructs the CA system (60) to perform a concentration control operation of controlling the composition of the air inside the container (11) (oxygen concentration and carbon dioxide concentration) to a desired composition (e.g., 3% oxygen and 5% carbon dioxide). In the concentration control operation, the controller (55) controls the operations of the gas supply device (30) and the exhaust portion (46) based on measurement results obtained by the oxygen sensor (51) and the carbon dioxide sensor (52) so that the composition of the air inside the container (11) will be a desired composition.

During the concentration control operation, the controller (55) closes the measurement on-off valve (82). Furthermore, during the concentration control operation, the controller (55) communicates with the unit controller (100) to instruct the unit controller (100) to rotate the internal fans (26). Thus, the inside air is supplied to the oxygen sensor (51) and the carbon dioxide sensor (52) by the internal fans (26), and then the oxygen concentration and the carbon dioxide concentration of the inside air are measured.

(Control of Oxygen Concentration)

[First Operation Mode]

If the oxygen concentration of the inside air measured by the oxygen sensor (51) is higher than 8%, the controller (55) performs the first operation mode.

In the first operation mode, as illustrated in FIG. 9, the controller (55) alternately repeats the first operation and the second operation, with the pressure equalization operation performed during the intervals, by selectively operating the first and second directional control valves (32) and (33), thereby producing nitrogen-enriched air having a higher nitrogen concentration and lower oxygen concentration than the outside air (a gas production operation). In this embodiment, the operational time of the first and second operations is set 14.5 seconds each, and the operational time of the pressure equalization operation is set 1.5 seconds.

In the first operation mode, as illustrated in FIGS. 4, 5, and 10, the controller (55) instructs the exhaust open/close valve (72) to close and the supply open/close valve (76) to open to perform the gas supply operation of supplying into the container (11) the nitrogen-enriched air produced in the gas production operation described above.

Note that in the initial stage and the terminal stage of the first and second operations, the composition of the nitrogen-enriched air to be produced is different. Specifically, in the initial stage of each operation, the outside air remains in an adsorption column and a pipe, for example, so that generated nitrogen-enriched air is relatively high in oxygen concentration. In the terminal stage of each operation, the pressure within an adsorption column is lower than that in the initial stage and much nitrogen component is desorbed, so that generated nitrogen-enriched air is relatively low in oxygen concentration. In the first operation mode, all the generated nitrogen-enriched air is supplied into the container (11) in each of the first and second operation modes. As a result, the nitrogen-enriched air having a mean nitrogen concentration of 92% (i.e., a mean value of the nitrogen concentration of the nitrogen-enriched air to be supplied into the container (11) in each of the first and second operations) and a mean oxygen concentration of 8% (i.e., a mean value of the oxygen concentration of the nitrogen-enriched air to be supplied into the container (11) in each of the first and second operations) is supplied into the container (11).

Furthermore, in the first operation mode, the controller (55) instructs the exhaust valve (46b) of the exhaust portion (46) to open to perform the exhaust operation, so that the air inside the container (11) is exhausted out of the container (11) only by the amount of the nitrogen-enriched air supplied into the container (11) during the gas supply operation.

In the first operation mode, the inside air is replaced with the nitrogen-enriched air by the above-described gas supply operation and exhaust operation, and the oxygen concentration of the inside air falls.

[Second Operation Mode]

When the oxygen concentration of the air inside the container (11) falls to 8% in the first operation mode, the controller (55) performs the second operation mode.

In a similar manner as the first operation mode, as illustrated in FIG. 9, the controller (55) in the second operation mode alternately repeats the first operation and the second operation, with the pressure equalization operation performed during the intervals, by selectively operating the first and second directional control valves (32) and (33), thereby producing nitrogen-enriched air having a higher nitrogen concentration and a lower oxygen concentration than the outside air (a gas production operation).

Meanwhile, in the second operation mode, as illustrated in FIGS. 7 and 11, the controller (55) instructs the exhaust open/close valve (72) to open and the supply open/close valve (73) to close during a predetermined time period for an initial stage of the first and second operations (in this embodiment, for four seconds since the start of each operation) to perform the gas exhaust operation of exhausting out of the container (11) the nitrogen-enriched air produced in the gas generation operation described above, instead of supplying the nitrogen-enriched air into the container (11). Then, after the gas exhaust operation ends, the controller (55) instructs the exhaust open/close valve (72) to close and the supply open/close valve (73) to open to perform the gas supply operation of supplying into the container (11) the nitrogen-enriched air produced in the gas production operation described above.

In the second operation mode, the above gas exhaust operation is performed to exhaust nitrogen-enriched air out of the container (11) at the initial stage of the first and second operations, instead of supplying the nitrogen-enriched air into the container (11). Thus, the second operation mode stops supplying into the container (11) nitrogen-enriched air found immediately after the desorption operation and having a relatively high oxygen concentration. As a result, supplied into the container (11) is nitrogen-enriched air having a mean nitrogen concentration of 95% and a mean oxygen concentration of 5%. Hence, the second operation mode involves supplying nitrogen-enriched air lower in oxygen concentration than the nitrogen-enriched air supplied into the container (11) in the first operation mode.

Furthermore, also in the second operation mode as seen in the first operation mode, the controller (55) instructs the exhaust valve (46b) of the exhaust portion (46) to open to perform the exhaust operation, so that the air inside the container (11) is exhausted out of the container (11) only by the amount of the nitrogen-enriched air supplied into the container (11) during the gas supply operation.

In the second operation mode, the inside air is replaced with the nitrogen-enriched air by the above-described gas supply operation and exhaust operation, and the oxygen concentration of the inside air falls.

[Stop Mode]

When the oxygen concentration of the air in the container (11) falls to 5%, the controller (55) stops the operation of the gas supply device (30) to stop the gas supply operation, and also closes the exhaust valve (46b) to stop the exhaust operation (stop mode).

When the gas supply operation and the exhaust operation are stopped, the air inside the container (11) is no longer replaced, but the plants (15) keep breathing. Therefore, in the container (11), the oxygen concentration of the air falls and the carbon dioxide concentration of the air rises. The oxygen concentration of the inside air will eventually reach the target oxygen concentration of 3%.

If the air inside the container (11) falls below 3% due to the breathing, the gas supply device (30) resumes operation in the first operation mode. In the first operation mode, the gas supply operation and the exhaust operation are performed. In the gas supply operation, nitrogen-enriched air having a mean oxygen concentration of 8% is supplied into the container (11). In the exhaust operation, the exhaust valve (46b) of the exhaust portion (46) is instructed to open, so that the air inside the container (11) is exhausted out of the container (11) only by the amount of the nitrogen-enriched air supplied into the container (11) during the gas supply operation. Through the gas supply operation and the exhaust operation, the inside air is replaced with nitrogen-enriched air higher in oxygen concentration (e.g., a mean oxygen concentration of 8%) than the inside air. Thus, the oxygen concentration of the air inside the container (11) rises.

When the oxygen concentration of the inside air rises (3.5%) above the target oxygen concentration (3%) by a predetermined concentration (e.g., 0.5%), the controller (55) stops the operation of the gas supply device (30) to stop the gas supply operation, and also closes the exhaust valve (46b) to stop the exhaust operation.

Note that in the control of the oxygen concentration in the inside air, an outside air introduction operation and the exhaust operation may be performed instead of the first operation mode. In the outside air introduction operation, the bypass open/close valve (48) is opened to cause the outside air sucked into the air pump (31) to bypass the first and second adsorption columns (34, 35), so that the outside air is directly supplied into the container (11). In the exhaust operation, the exhaust valve (46b) of the exhaust portion (46) is instructed to open so that the inside air is exhausted out of the container (11) only by the amount of the outside air supplied into the container (11) by the outside air introduction operation. Through the gas supply operation and the exhaust operation thus performed, the air inside the container (11) is replaced with the outside air having an oxygen concentration of 21%. Thus, the oxygen concentration of the inside air rises.

(Control of Carbon Dioxide Concentration)

If the carbon dioxide concentration of the inside air measured by the carbon dioxide sensor (52) is higher than 5%, the controller (55) performs the first operation mode illustrated in FIG. 10. In the first operation mode, the gas supply operation and the exhaust operation are performed. In the gas supply operation, nitrogen-enriched air having a mean nitrogen concentration of 92% and a mean oxygen concentration of 8% is supplied into the container (11). In the exhaust operation, the exhaust valve (46b) of the exhaust portion (46) is instructed to open, so that the inside air is exhausted out of the container (11) only by the amount of the nitrogen-enriched air supplied into the container (11) during the gas supply operation. Through the gas supply operation and the exhaust operation thus performed, the inside air is replaced with the nitrogen-enriched air having a carbon dioxide concentration of 0.03%. Thus, the carbon dioxide concentration of the air in the container (11) falls.

When the carbon dioxide concentration of the inside air falls (4.5%) below the target carbon dioxide concentration (5%) by a predetermined concentration (e.g., 0.5%), the controller (55) stops the operation of the gas supply device (30) to stop the gas supply operation, and also closes the exhaust valve (46b) to stop the exhaust operation.

Note that the carbon dioxide concentration of the inside air may also be controlled by the above outside air introduction operation with the bypass open/close valve (48) opening, instead of by the outside air introduction operation. Through the outside air introduction operation and the exhaust operation thus performed, the inside air is replaced with the outside air having a carbon dioxide concentration of 0.03%. Thus, the carbon dioxide concentration of the air in the container (11) falls.

[Supply Air Measurement Operation]

Furthermore, the controller (55) performs the supply air measurement operation of measuring the oxygen concentration of the nitrogen-enriched air produced in the gas supply device (30) in accordance with a command entered by a user or periodically (e.g., every ten days). Note that the supply air measurement operation is performed concurrently when the internal fans (26) are stopped during the gas supply operation for the concentration control operation described above or test run.

During the gas supply operation, the controller (55) controls the gas supply open/close valve (82) to open, and the supply open/close valve (73) to close. As a result, all the nitrogen-enriched air flowing through the supply passage (44) flows into the branch pipe (81). The nitrogen-enriched air that has flowed into the branch pipe (81) flows into the oxygen sensor box (51a) of the oxygen sensor (51), which measures the oxygen concentration of the nitrogen-enriched air.

In this manner, whether the composition (oxygen concentration and nitrogen concentration) of the nitrogen-enriched air produced in the gas supply device (30) is in a desired state may be determined through the measurement of the oxygen concentration of the nitrogen-enriched air produced in the gas supply device (30).

<Operations of Gas Supply Device and Internal Fan Controller>

Figure 12:
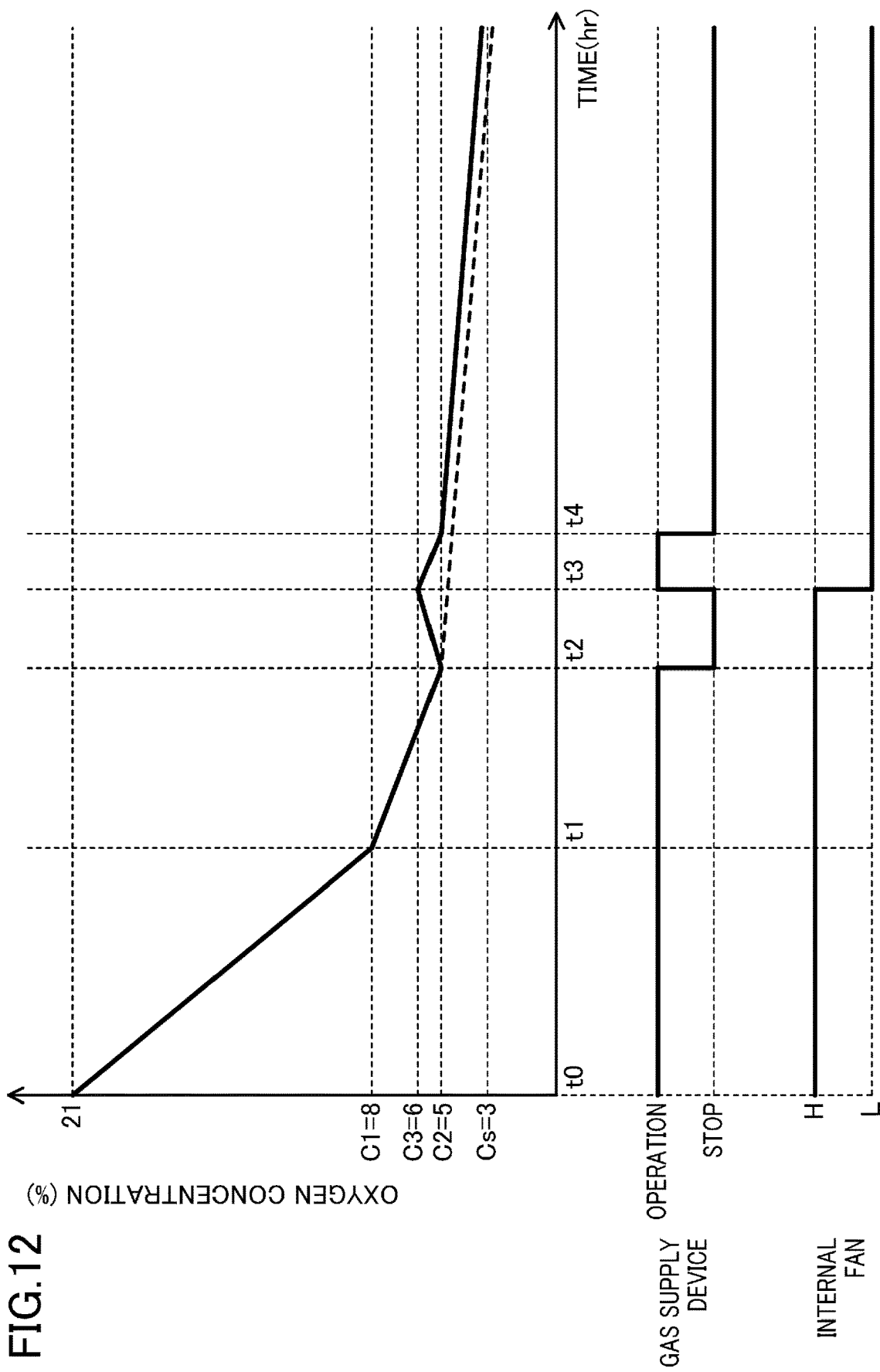
FIG. 12 is a graph illustrating how an oxygen concentration of an internal space of a container temporally changes during pull down of the oxygen concentration.

Operations of the gas supply device (30) and the internal fan controller (101) are described with reference to FIG. 12. FIG. 12 illustrates a temporal change in oxygen concentration of the internal space (11a) during pull down in which the oxygen concentration of the internal space (11a) is decreased from 21% (i.e., the oxygen concentration of the outdoor air) to the setting concentration Cs.

In the controller (55) of the gas supply device (30) according to this embodiment, the mode switching reference concentration C1 is set to the same value as a mean oxygen concentration (8% in this embodiment) of the nitrogen-enriched air to be supplied to the internal space (11a) by the gas supply device (30) in the first operation mode, and the stop reference concentration C2 is set to the same value as a mean oxygen concentration (5% in this embodiment) of the nitrogen-enriched air to be supplied to the internal space (11a) by the gas supply device (30) in the second operation mode. Furthermore, in this controller (55), the upper limit concentration C3 is set 6%, and the setting concentration Cs is set 3%. Note that the values of these concentrations are merely examples.

At a time t0, the pull down of the oxygen concentration of the internal space (11a) is started. Specifically, at the time t0, the gas supply device (30) starts to operate. Here, the controller (55) of the gas supply device (30) performs the first operation mode. The gas supply device (30) supplies nitrogen-enriched air having a mean oxygen concentration of 8% and a mean nitrogen concentration of 92% to the internal space (11a) of the container (11). As a result, the oxygen concentration of the internal space (11a) gradually falls from 21%.

Here, the internal fan controller (101) usually sets the rotational speed of the internal fans (26) "HIGH." This is to swirl the air in the internal space (11a) to make the temperature in the internal space uniform throughout each of the parts of the internal space (11a). Thus, even during the pull down, started at the time t0, of the oxygen concentration of the internal space (11a), the internal fan controller (101) sets the rotational speed of the internal fans (26) "HIGH" in principle.

When the oxygen concentration of the internal space (11a) reaches the mode switching reference concentration C1 of 8% at the time t1, the controller (55) of the gas supply device (30) stops the first operation mode and starts the second operation mode. When this controller (55) performs the second operation mode, the gas supply device (30) supplies nitrogen-enriched air having a mean oxygen concentration of 5% and a mean nitrogen concentration of 95% to the internal space (11a) of the container (11). As a result, the oxygen concentration of the internal space (11a) gradually falls from 8%.

When the oxygen concentration of the internal space (11a) reaches the stop reference concentration C2 of 5% at the time t2, the controller (55) stops the operation of the gas supply device (30). While the gas supply device (30) stops, the air pump (31) stops, so does the supply of nitrogen-enriched air to the internal space (11a).

From the time t0 to the time t2, the internal fan controller (101) maintains the rotational speed of the internal fans (26) "HIGH." Moreover, after the time t2, the internal fan controller (101) keeps maintaining the rotational speed of the internal fans (26) "HIGH."

Here, during the operation of the internal fans (26), the air pressure of the primary space (S21) located toward the inlet side of the internal fans (26) falls below the air pressure of the internal space (11a) of the container (11), and the air pressure of the secondary space (S22) located toward the outlet side of the internal fans (26) rises above the air pressure of the internal space (11a) of the container (11). When the rotational speed of the internal fans (26) is set "HIGH", the primary space (S21) could have an area the air pressure of which is below the atmospheric pressure.

If connections between the container refrigeration apparatus (10) and the container (11) are sufficiently hermetic, substantially no outside air enters the internal space (11a) through a gap between the container refrigeration apparatus (10) and the container (11) even if the primary space (S21) has the area the air pressure of which is below the atmospheric pressure. Hence, after the gas supply device (30) stops at time t2, the oxygen in the inside air is consumed by the breathing plants stored in the internal space (11a). As indicated with a broken line in FIG. 12, the oxygen concentration in the internal space (11a) gradually falls.

However, if connections between the container refrigeration apparatus (10) and the container (11) are not sufficiently hermetic, a relatively large amount of outside air enters the internal space (11a) through the gap between the container refrigeration apparatus (10) and the container (11). Then, when the amount of oxygen in the outside air entering the internal space (11a) per unit time exceeds the amount of oxygen to be consumed per unit time by the breathing plants in the internal space (11a), the oxygen concentration of the internal space (11a) gradually rises after the gas supply device (30) stops at the time t2 as indicated with a solid line in FIG. 12.

In the internal fan controller (101) of this embodiment, the condition in which the oxygen concentration of the internal space (11a) is the upper limit concentration of 6% is a concentration-rise condition indicating a rise in the oxygen concentration of the internal space (11a). When the oxygen concentration of the internal space (11a) reaches the upper limit concentration C3 of 6% (i.e., if the concentration-rise condition is met while the gas supply device (30) stops) at the time t3, the internal fan controller (101) determines whether a temperature T detected by the internal temperature sensor (150) is within a predetermined target range (e.g., 5° C.±1° C.); that is, whether a condition 4° C.≤T≤6° C. is met in this example.

Then, if the concentration-rise condition is met at the time t3 and the temperature T detected by the internal temperature sensor (150) is within the predetermined target range, the internal fan controller (101) performs, as a fan-speed limiting operation, an operation of switching the rotational speed of the internal fans (26) from "HIGH" to "LOW." Compared with a state where the rotational speed of the internal fans (26) is set "HIGH", in a state where the rotational speed of the internal fans (26) is set "LOW", the air pressure of the primary space (S21) located toward the inlet side of the internal fans (26) rises. As a result, a decrease is observed in the amount of the outside air entering the internal space (11a) through the gap between the container refrigeration apparatus (10) and the container (11).

Moreover, when the oxygen concentration of the internal space (11a) reaches the upper limit concentration C3 of 6% at the time t3, the gas supply device (30) starts to operate. Then, the controller (55) of the gas supply device (30)

performs the second operation mode. Thus, the gas supply device (30) supplies nitrogen-enriched air having a mean oxygen concentration of 5% into the internal space (11a).

Hence, when the oxygen concentration of the internal space (11a) reaches the upper limit concentration C3 of 6% at the time t3, the rotational speed of the internal fans (26) becomes "LOW" and the gas supply device (30) starts to operate. Thus, after the time t3, the oxygen concentration of the internal space (11a) gradually falls.

When the oxygen concentration of the internal space (11a) reaches the stop reference concentration C2 of 5% at the time t4, the controller (55) stops the operation of the gas supply device (30). Meanwhile, after the time t4, the internal fan controller (101) still maintains the rotational speed of the internal fans (26) "LOW." Hence, even after the time t4, the amount of the outside air entering the internal space (11a) through the gap between the container refrigeration apparatus (10) and the container (11) is kept small.

Hence, after the gas supply device (30) stops at time t4, the oxygen in the inside air is consumed by the breathing plants stored in the internal space (11a). As indicated with the solid line in FIG. 12, the oxygen concentration in the internal space (11a) gradually falls. Then, after the oxygen concentration of the internal space (11a) reaches the setting concentration Cs of 3%, the CA system (60) performs an operation to maintain the oxygen concentration of the above internal space (11a) at 3%.

Meanwhile, if the concentration-rise condition is met at the time t3 but the temperature T detected by the internal temperature sensor (150) is out of the predetermined target range (i.e., T<4° C. or T>6° C.), the internal fan controller (101) keeps maintaining the rotational speed of the internal fans (26) "HIGH." Specifically, the internal fan controller (101) performs the fan-speed limiting operation only if the temperature T detected by the internal temperature sensor (150) is within the predetermined target range. If the temperature T detected by the internal temperature sensor (150) is out of the target range, the internal fan controller (101) does not perform the fan-speed limiting operation. This is because setting the temperature of the inside air of the internal space (11a) within the target range is prioritized over decreasing the oxygen concentration of the internal space (11a) to the setting concentration Cs.

If, at the time t3, the concentration-rise condition is met but the temperature T detected by the internal temperature sensor (150) is out of the predetermined target range, the gas supply device (30) starts to operate in a similar manner as the temperature T detected by the internal temperature sensor (150) is within the target range. Then, the controller (55) of the gas supply device (30) performs the second operation mode. Thus, the gas supply device (30) supplies nitrogen-enriched air having a mean oxygen concentration of 5% into the internal space (11a). Then, the internal space (11a) is supplied by the gas supply device (30) with nitrogen-enriched air having a mean oxygen concentration of 5%, and the oxygen concentration of the internal space (11a) gradually falls.

Note that after the time t4, the internal fan controller (101) continues to monitor the temperature T detected by the internal temperature sensor (150). Then, if the temperature T detected by the internal temperature sensor (150) is out of the target range, the internal fan controller (101) sets the rotational speed of the internal fans (26) "HIGH." After that, when the temperature T detected by the internal temperature sensor (150) comes within the target range, the internal fan controller (101) brings the rotational speed of the internal fans (26) back to "LOW."

Advantages of Embodiment

If the concentration-rise condition is met while the gas supply device stops, the internal fan controller (101) of this embodiment performs the fan-speed limiting operation to switch the rotational speed of the internal fans (26) from "HIGH" to "LOW." Such a feature makes it possible to reduce the amount of outside air entering the internal space (11a) of the container (11), contributing to curbing a rise in oxygen concentration of the internal space (11a) while the gas supply device (30) stops. As a result, the oxygen concentration of the air inside the container (11) can reliably fall, so that objects such as plants stored in the container (11) can remain fresh.

When the plants such as bananas and avocados are stored in the internal space (11a) of the container (11), if the amount of oxygen to be consumed per unit time by the breathing plants stored in the internal space (11a) exceeds the amount of oxygen in outside air entering the internal space (11a) per unit time, the oxygen concentration of the internal space (11a) gradually falls even if the gas supply device (30) remains stopping.

Meanwhile, in this embodiment, if the concentration-rise condition is met while the gas supply device stops, the gas supply device (30) starts to operate. Hence, nitrogen-enriched air is supplied to the internal space (11a) of the container (11), contributing to an immediate fall of the oxygen concentration of the internal space (11a).

Modification 1 of Embodiment

The gas supply device (30) of this embodiment starts to operate to supply nitrogen-enriched air into the internal space (11a) if the concentration-rise condition is met while the gas supply device (30) stops. Whereas, the gas supply device (30) may be left stopped even if the concentration-rise condition is met while the gas supply device (30) stops. Also in this case, the oxygen concentration of the internal space (11a) gradually falls if the amount of oxygen entering the internal space (11a) per unit time falls below the amount of oxygen to be consumed per unit time by breathing plants in the internal space (11a).

Modification 2 of Embodiment

In the internal fan controller (101) of this embodiment, the condition in which the oxygen concentration of the internal space (11a) is the upper limit concentration of 6% is a concentration-rise condition indicating a rise in the oxygen concentration of the internal space (11a). However, this is a mare example. In the internal fan controller (101), for example, the concentration-rise condition may be a condition in which a current oxygen concentration of the internal space (11a) is above the oxygen concentration of the internal space (11a) before the predetermined time period.

Modification 3 of Embodiment

The internal fan controller (101) of this embodiment may control the rotational speed of the internal fans (26) in three stages or more. Described here is how the internal fan controller (101) of this modification operates when the internal fan controller (101) controls the rotational speed of the internal fans (26) from the lowest speed of "FIRST STAGE" to the highest speed of "FOURTH STAGE."

From the time t0 to the time t3 in FIG. 12, the internal fan controller (101) of this modification sets the rotational speed of the internal fans (26) either "THIRD STAGE" or "FOURTH STAGE", for example. Then, if the concentration-rise condition is met at the time t3 and the temperature T detected by the internal temperature sensor (150) is within the target range, the internal fan controller (101) of this modification sets the rotational speed of the internal fans (26) either "FIRST STAGE" or "SECOND STAGE" lower than "THIRD STAGE" and "FOURTH STAGE." In this case, the rotational speed of the internal fans (26) at "SECOND STAGE" is a reference rotational speed.

Modification 4 of Embodiment

In this embodiment, a single air pump (31) is configured to include the first and second pump mechanisms (31a) and (31b). However, the first and second pump mechanisms (31a) and (31b) may be configured as two separate air pumps.

Modification 5 of Embodiment

In this embodiment, two separate adsorption columns are used as first and second adsorption portions for adsorption and desorption of nitrogen. However, the number of the adsorption columns serving as a single adsorption portion is not limited to one. For example, each of the first and second adsorption portions may be comprised of three adsorption columns, i.e., six adsorption columns in total may be used.

INDUSTRIAL APPLICABILITY

As can be seen, the present invention is useful for a container refrigeration apparatus having a gas supply device supplying nitrogen-enriched air into a container.

DESCRIPTION OF REFERENCE CHARACTERS

10 Container Refrigeration Apparatus
11 Container
11a Internal Space
26 Internal Fan
30 Gas Supply Device
101 Internal Fan Controller

The invention claimed is:

1. A container refrigeration apparatus provided to a container and cooling air inside the container, the container refrigeration apparatus comprising:
an internal fan sucking the air from an internal space of the container and supplying the sucked air to the internal space of the container;
an internal fan controller controlling a rotational speed of the internal fan;
a gas supply device supplying the internal space of the container with nitrogen-enriched air higher in nitrogen concentration and lower in oxygen concentration than outside air; and
a gas supply device controller starting and stopping the gas supply device on the basis of a detected oxygen concentration of the internal space, wherein
in response to a fact that the oxygen concentration of the internal space falls to a reference concentration, the gas supply device controller is programmed to stop the gas supply device, and if the gas supply device is stopped, the internal fan controller is programmed to:
determine whether a concentration rise condition indicating a rise of the detected oxygen concentration of the internal space is met,
respond to a determination that the concentration rise condition is not met by maintaining the rotation speed of the internal fan at a current rotational speed, and
respond to a determination that the concentration rise condition is met by performing a fan-speed limiting operation of decreasing the rotational speed of the internal fan and maintaining the rotational speed at a reference rotational speed or below.

2. The container refrigeration apparatus of claim 1, wherein
the concentration-rise condition of the internal fan controller is a condition in which the oxygen concentration of the internal space rises to an upper limit concentration higher than the reference concentration.

3. The container refrigeration apparatus of claim 1, wherein
the gas supply device controller is programmed to respond to a determination that the concentration-rise condition is met while the gas supply device is stopped by starting operation of the gas supply device.

4. A container refrigeration apparatus provided to a container and cooling air inside the container, the container refrigeration apparatus comprising:
an internal fan sucking the air from an internal space of the container and supplying the sucked air to the internal space of the container;
an internal fan controller controlling a rotational speed of the internal fan;
a gas supply device supplying the internal space of the container with nitrogen-enriched air higher in nitrogen concentration and lower in oxygen concentration than outside air; and
a gas supply device controller starting and stopping the gas supply device on the basis of a detected oxygen concentration of the internal space, wherein
in response to a fact that the oxygen concentration of the internal space falls to a reference concentration, the gas supply device controller is programmed to stop the gas supply device, and
if the gas supply device is stopped and a detected temperature of the internal space is within a predetermined target range, the internal fan controller is programmed to:
determine whether a concentration rise condition indicating a rise of the detected oxygen concentration of the internal space is met,
respond to a determination that the concentration rise condition is not met by maintaining the rotation speed of the internal fan at a current rotational speed, and
respond to a determination that the concentration rise condition is met by performing a fan-speed limiting operation of decreasing the rotational speed of the internal fan and maintaining the rotational speed at a reference rotational speed or below.

5. The container refrigeration apparatus of claim 4, wherein
the concentration-rise condition of the internal fan controller is a condition in which the oxygen concentration of the internal space rises to an upper limit concentration higher than the reference concentration.

6. The container refrigeration apparatus of claim 4, wherein
the gas supply device controller is programmed to respond to a determination that the concentration-rise condition is met while the gas supply device is stopped by starting operation of the gas supply device.

7. A method for operating a container refrigeration apparatus provided to a container to cool air inside the container, the container refrigeration apparatus including an internal fan sucking the air from an internal space of the container and supplying the sucked air to the internal space of the container, the method comprising:
supplying the internal space of the container with nitrogen-enriched air higher in nitrogen concentration and lower in oxygen concentration than outside air to reduce oxygen concentration of the internal space;
stopping supply of the nitrogen-enriched air to the internal space if the oxygen concentration of the internal space falls to a reference concentration;
maintaining a rotation speed of the internal fan at a current rotational speed if a concentration-rise condition indicating a rise of the oxygen concentration of the internal space is not met while supply of the nitrogen-enriched air to the internal space is stopped; and
decreasing the rotational speed of the internal fan and maintaining the rotational speed at a reference rotational speed or below if the concentration-rise condition is met while supply of the nitrogen-enriched air to the internal space is stopped.

* * * * *